US007701804B2

(12) United States Patent
Agullo et al.

(10) Patent No.: US 7,701,804 B2
(45) Date of Patent: Apr. 20, 2010

(54) METHOD AND CONSTRUCTING A MODEL OF A HETEROGENEOUS MEDIUM DESCRIBED BY SEVERAL PARAMETERS FROM DATA EXPRESSED IN DIFFERENT TIME SCALES

(75) Inventors: Yohan Agullo, Rueil Malmaison (FR); Danièle Mace-Prieur, Rueil Malmaison (FR); Thierry Tonellot, Rueil Malmaison (FR); Marc Lavielle, Villebon sur Yvette (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 756 days.

(21) Appl. No.: 11/194,528

(22) Filed: Aug. 2, 2005

(65) Prior Publication Data
US 2006/0023569 A1 Feb. 2, 2006

(30) Foreign Application Priority Data
Aug. 2, 2004 (FR) .................... 04 08517

(51) Int. Cl.
*G01V 1/00* (2006.01)
(52) U.S. Cl. ........................................ 367/51
(58) Field of Classification Search .............. 367/50, 367/51, 38
See application file for complete search history.

(56) References Cited

U.S. PATENT DOCUMENTS

| 5,583,825 | A * | 12/1996 | Carrazzone et al. ............ 367/31 |
| 6,381,543 | B1 | 4/2002 | Guerillot et al. |
| 6,424,920 | B1 * | 7/2002 | Osypov ........................ 702/18 |
| 6,430,507 | B1 * | 8/2002 | Jorgensen et al. ............... 702/6 |
| 6,522,973 | B1 * | 2/2003 | Tonellot et al. ................ 702/16 |
| 6,587,791 | B2 * | 7/2003 | Dablain et al. ................ 702/16 |
| 6,611,764 | B2 * | 8/2003 | Zhang ........................ 702/18 |
| 6,662,147 | B1 | 12/2003 | Gournle et al. |
| 6,993,433 | B2 * | 1/2006 | Chavarria et al. ............. 702/14 |
| 7,356,410 | B2 * | 4/2008 | Rode et al. ..................... 702/2 |
| 2004/0064294 | A1 * | 4/2004 | Van Riel et al. ............. 702/189 |
| 2005/0273266 | A1 * | 12/2005 | Nickel ........................ 702/14 |

(Continued)

OTHER PUBLICATIONS

Veire et al. Simultaneous inversion of PP and PS seismic data. Geophysics. vol. 71. No. 3. pp. R1-R10. May-Jun. 2006.*

(Continued)

*Primary Examiner*—Jack W. Keith
*Assistant Examiner*—Krystine Saito
(74) *Attorney, Agent, or Firm*—Antonelli, Terry, Stout & Kraus, LLP.

(57) ABSTRACT

A method for constructing a model representative of a heterogeneous medium from data expressed in different time scales with application to hydrocarbon characterization. The method first estimates sequentially, from the data expressed in each different time scale, parameters or physical quantities of the model, described for each different time scale. Second, a scale factor allowing conversion of a model described in a time scale into a model described in another time scale is determined. This determination is carried out by minimizing the dissimilarity between a parameter estimated in a time scale and this parameter estimated in the other time scale. Finally, estimation of a single model is performed, by taking simultaneously an account of the data expressed in the various time scales, and using the scale factor found previously for the time scale conversions.

13 Claims, 6 Drawing Sheets

U.S. PATENT DOCUMENTS

2007/0081422 A1* 4/2007 Zou et al. .................... 367/73
2008/0225641 A1* 9/2008 Van Manen et al. .......... 367/38

OTHER PUBLICATIONS

Ferguson et al. Joint Inversion of P- and Sv-wave traveltime error to estimate anisotropy: A CFP approach. SEG Technical Program Expanded Abstracts. 2004. pp. 885-888.*

Grechka et al. Joint Traveltime Inversion of P- and PS-waves in orthorhombic media. $59^{th}$ Eage Conf. May 26-30, 1997. Extended Abstr. v. 1, pap. No. E007. 1997.*

Rossi et al. Joint 3D Inversion of Direct, Reflected and Head Waves for Environment and Engineering. $61^{st}$ Eage Conf. Jun. 7-11, 1999. Extended Abstr. v. 1, pap. No. 4-23. 1999.*

Rossi et al. Joint 3D Traveltime Inversion of P, S and Converted Waves. 4th Osserv. Geofis. Sperim. Trieste et al. Theor. & Comput. Acoust. Int. Conf. Tireste, Italy May 10-14, 1999. v.40, No. 1, p. 33. Mar. 1999.*

Kazatchenko et al. Joint Inversion of Conventional Well Logs for Evalution of double-porosoity carbonate formations. Journal of Petroleum Science and Engineering 56 (2007), pp. 252-266.*

Ferguson et al. Joint Inversion of P- and SV-wave traveltime error to estimate anisotropy: a CFP approach. pp. 885-888.*

Jeffrey A. Larsen. AVO Inversion by Simultaneous P-P and P-S Inversion. M.Sc. Thesis—University of Calgary—Department of Geology and Geophysics. Sep. 1999. Downloaded from: http://www.crewes.org/ResearchLinks/GraduateTheses/1999/Larsen-MSc-1999.pdf on Jun. 22, 2008.*

* cited by examiner

METHOD AND CONSTRUCTING A MODEL OF A HETEROGENEOUS MEDIUM DESCRIBED BY SEVERAL PARAMETERS FROM DATA EXPRESSED IN DIFFERENT TIME SCALES

BACKGROUND OF THE INVENTION

1. Field of the Invention

The invention relates to a method for constructing a model representative of a heterogeneous medium such as the subsoil, described by several parameters (which can be physical quantities or combinations of physical quantities) from data expressed in different time scales.

2. Description of the Prior Art

The following documents, mentioned in the description hereafter, illustrate the state of the art:

Aki, K., and Richards, P. G., 1980, Quantitative Seismology: Theory and Method, Vol.1: W.H. Freeman and Co De Nicolao, A., Drufuca, G., and Rocca, F., 1993, Eigenvalues and eigenvectors of Linearized Elastic Inversion: Geophysics, 58, 670-679.

Gaiser, J. E., 1996, Multicomponent Vp/Vs Correlation Analysis: Geophysics, 61, 1137-1149.

Garotta, R., Granger, P-Y., and Dariu, H., 2000, Elastic Parameter Derivations from Multi-component Data, $70^{th}$ Ann. Internat. Mtg., Soc. Expl. Geophys., Expanded Abstracts, 154-157.

Lebrun, D., Richard, V., Mace, D., and Cuer, M., 2001, SVD for Multi-Offset Linearized Inversion: Resolution Analysis in Multicomponent Acquisition: Geophysics, 66, 871-882.

Tonellot, T., Macé, D., Richard, V., and Cuer, M., 2001, Joint Stratigraphic Inversion of Angle-Limited Stacks, 71th Ann. Internat. Mtg., Soc. Expl. Geophys., Expanded Abstracts, 227-230.

In general terms, inversion is a technique allowing estimation of a model described by one or more parameters from indirect data. This technique is generally used when the parameters cannot be directly measured. This technique implies that one knows how to solve the problem of predicting the data when the parameters of the model are known (modelling allowing obtaining data referred to as synthetic data).

This is for example the case within the context of oil exploration where geological and petrophysical data characterizing a three-dimensional reservoir where only seismic data can generally be measured on a large scale are sought. In this context, the purpose of inversion is to determine parameters such as the impedances in relation to P waves or S waves, or the density, from seismic data coming from waves emitted in the medium by a seismic source. These waves are propagated in the subsoil and reflected on the medium discontinuities. They are recorded by pickups coupled with the underground formation and collected by an acquisition device. The seismic data used within the context of the description of the method thus contain information on the amplitude variation with the offset (source-receiver distance), that is with the incidence angle; they are referred to as prestack seismic data. Several wave types are propagated in an elastic medium. P waves (compressional waves or longitudinal waves) which correspond to a displacement in the direction of propagation and S waves (shear waves or transverse waves) which correspond to a displacement in a plane perpendicular to the direction of propagation and are not propagated in a fluid medium can be mentioned from among the most commonly used waves in the petroleum industry. These P and S waves are propagated at different velocities, velocity Vp of the P waves being higher than velocity Vs of the S waves. They reflect at the subsoil discontinuity interfaces and are recorded by the acquisition device. P waves can reflect in waves of the same type (PP reflections) or in waves of the other type (PS reflections). Terrestrial acquisition techniques and new marine acquisition techniques, for which the receivers are laid on the sea bottom and record the 3 displacement components (x,y,z) (multicomponent seismic data), allow the P and S waves reflected in the subsoil to be directly recorded. PP reflections, referred to as PP data, correspond to the record of a signal (seismogram) coming from waves transmitted in P type waves and reflected in P type waves in the subsoil. The amplitude of this signal is variable as a function of the time referred to as PP time. Similarly, PS reflections, referred to as PS data, correspond to the record of a signal coming from waves transmitted in P type waves and reflected in S type waves in the subsoil. The amplitude of this signal is variable as a function of the time referred to as PS time. The P and S waves being propagated at different velocities, a single geologic reflector will thus correspond to a signal variation at a time PP and at a time PS, these times being different. Besides, since these two signal variations correspond to reflections of different types, they have different values.

In the case of a medium such as the subsoil, the descriptive physical quantities are generally the impedance thereof in relation to these P waves or S waves, or its density. It is clear that the larger the number of physical quantities available to characterize the medium, the better the medium is described. This is why, in the petroleum industry, it has become equally important to estimate the P impedances and the S impedances. Each of these two physical quantities contains different information, which is necessary to correctly characterize a reservoir.

From the PP data, it is possible to carry out an inversion allowing estimation of the P impedances, the S impedances and the density. This is also the case with the PS data. However, several authors (De Nicolao et al., 1993; Lebrun et al., 2001) showed that, among the three parameters conventionally used and mentioned above, the P impedance (or more precisely its relative variation)

$$\frac{\Delta Ip}{Ip}$$

is the best determined parameter from the PP data; on the other hand, the confidence that one can have in the relative variation of the S impedance is more limited and depends on factors such as the noise level, the range of incidence angles available and the errors on determination of the velocity model. However, if PS data are available, it is possible to reliably estimate the relative variation of the S impedance, hence an ever-growing interest in the acquisition and processing of multicomponent seismic data. As for density, it is difficult to estimate whatever the type of data used.

In the petroleum industry, inversion methods were developed, allowing accounting for single-component seismic data, corresponding to a given reflection type, direct data and geologic data on the subsoil. An a priori model (1D, 2D or 3D) of one or more parameters characteristic of the medium is constructed by interpretation of the known direct or indirect data, and covariance operators describing the uncertainties on this a priori model and the uncertainties on the indirect data recorded are defined. The starting point is from an initial model (the a priori model for example) and synthetic seismograms which constitute the response of the model are calculated. They are compared with the real seismograms obtained by seismic exploration and the differences observed are minimized step by step according to norms associated with the covariance operators selected as a function of an evaluation of the uncertainties on the a priori model and the seismic records.

The various known approaches differ notably in the number of parameters describing the medium, the dimension of the a priori model, and the abundance of possibilities provided when taking into account the uncertainty parameters. They consist in obtaining the optimum model minimizing a cost function, the sum of a cost function referred to as seismic, and of a cost function referred to as geologic. The seismic cost function represents the difference (in the sense of the norm induced by the covariance operator relative to the data) between the observed data (real seismograms) and the synthetic data associated with the current model. The geologic cost function measures the difference between the current model and the a priori model (in the sense of the norm induced by the covariance operator relative to the medium).

There are methods for estimating several parameters in a medium. Among these approaches is the method described in French Patent 2,800,473 filed by the Assignee, which allows obtaining an optimum model in 2 or 3 dimensions (2D or 3D), described by several parameters from indirect data corresponding to a single type of data (PP for example).

When several types of data are available (PP and PS for example), it is necessary to be able to invert the data jointly so as to take advantage of the information contained in the P impedance estimated from the PP data and in the S impedance estimated from the PS data. The difficulty of the problem lies in the fact that, the PP and PS data being supplied at different time scales (the P and S velocities are different), a solution has to be found to associate with precision the events corresponding to a single geologic reflector; this amounts to estimating the ratio of the P and S velocities, denoted by $\gamma$.

Two types of approach can be considered for jointly inverting prestack multicomponent seismic data.

The first approach first estimates the P and S velocity models (by migration and focussing analysis for example) and in taking, as data of the joint inversion, the results (expressed in depth) of a prestack depth migration. This approach is attractive but remains delicate because sufficiently precise P and S velocities have to be estimated.

The second approach considers the results of the time migration as inputs for the joint inversion and thus has to solve the crucial problem of matching the arrival times of the PP and PS reflections. It is in this context that the method according to the invention should be seen.

Various matching techniques, directly from the PP and PS data, exist (Gaiser, 1996) but they implicitly presuppose that the contrasts of the P and S impedances are similar or at least have like signs, which is not always the case, in particular at the reservoir level. In Garotta et al.'s approach (2000), the amplitudes of the P and S data, in a lateral position and at a given time (but for different incidence angles), are used to calculate the conventional AVO (Amplitude Versus Offset) attributes by means of linear regression methods:
the ordinate at the PP origin, referred to as PP "intercept" and expressed in PP time,
the PP "gradient" expressed in PP time,
the PS "gradient" expressed in PS time.

The relative variation of ratio ($\gamma$) of the P and S velocities can then be expressed by a formula involving $\gamma$, the PP intercept, the PP gradient and the PS gradient converted to PP time using $\gamma$. On the other hand, for a given association of the PP and PS times, the corresponding $\gamma$ can be calculated. Ratio $\gamma$ calculated by Garotta et al. is the ratio which minimizes the difference between the relative variation of $\gamma$ from the propagation times and the relative variation of $\gamma$ from the AVO attributes.

SUMMARY OF THE INVENTION

The invention relates to a method for constructing a model representative of a heterogeneous medium described by at least one combination of at least one physical quantity (referred to as parameter in the description of the method). This construction is achieved from a procedure of joint inversion of data expressed in different time scales.

The method according to the invention relates to a method for constructing a model representative of a heterogeneous medium such as the subsoil, described by one or more parameters, from data expressed in different time scales, while overcoming, at least partly, the noise contained in these data.

The method is notably applied within the context of oil exploration to obtain quantitative representations and finer images of the structure or configuration of an underground zone, and it facilitates hydrocarbon reservoir characterization. In this context, the data expressed in different time scales can correspond to prestack multicomponent seismic data.

The method comprises the following stages:
determining a first estimation of at least one combination of physical quantities of the model from the data expressed in a first time scale;
determining at least a second estimation of the combination from the data expressed in at least a second time scale (if it is desired, during the joint inversion, to invert data expressed in x time scales, the combination has to be estimated from each of these x data or a common combination has to be estimated for each pair of time scales considered);
carrying out an analysis of the estimations to determine at least one scale factor allowing establishing a match between the first time scale and the second time scale; and
performing, in order to construct the representative model, the joint inversion procedure by minimizing a cost function wherein the scale factor allows expressing the synthetic data associated with the current model of the inversion described in a time scale, in another time scale, so as to evaluate a difference between these synthetic data and the data expressed in the other time scale.

According to the invention, the data expressed in different time scales can be data resulting from wave emissions in the medium, such as elastic waves or electromagnetic waves for example. These data can be prestacked multicomponent seismic data.

The various time scales can be the scale of the arrival times of the non-converted P waves (PP reflections), the scale of the arrival times of the converted P waves (PS reflections), the scale of the arrival times of the non-converted S waves (SS reflections) or the scale of the arrival times of the converted S waves (SP reflections).

In a particular embodiment of the method according to the invention, the combination of physical quantities can represent impedances. If prestack multicomponent seismic data are used, these impedances can be impedances in relation to S waves.

According to an embodiment of the invention, the estimation of the combinations of physical quantities can comprise using a single-component inversion. It can be a stratigraphic inversion comprising using a priori information including in-situ measured data.

The scale factor can be determined by minimizing the dissimilarity of the estimations of combinations of physical quantities of the model. It is sometimes judicious to determine only the low-frequency part of the scale factor. It is also sometimes preferable to carry out parametrization of the scale factor in a base consisting of a limited number of base functions. Determination of the factor is then clearly accelerated.

Finally, according to the method, the initial data that are expressed in different time scales undergo no scale change.

BRIEF DESCRIPTION OF THE DRAWINGS

Other features and advantages of the method according to the invention will be clear from reading the description hereafter of non-limitative embodiment examples, with reference to the accompanying figures wherein.

DETAILED DESCRIPTION OF THE INVENTION

Figure 1:
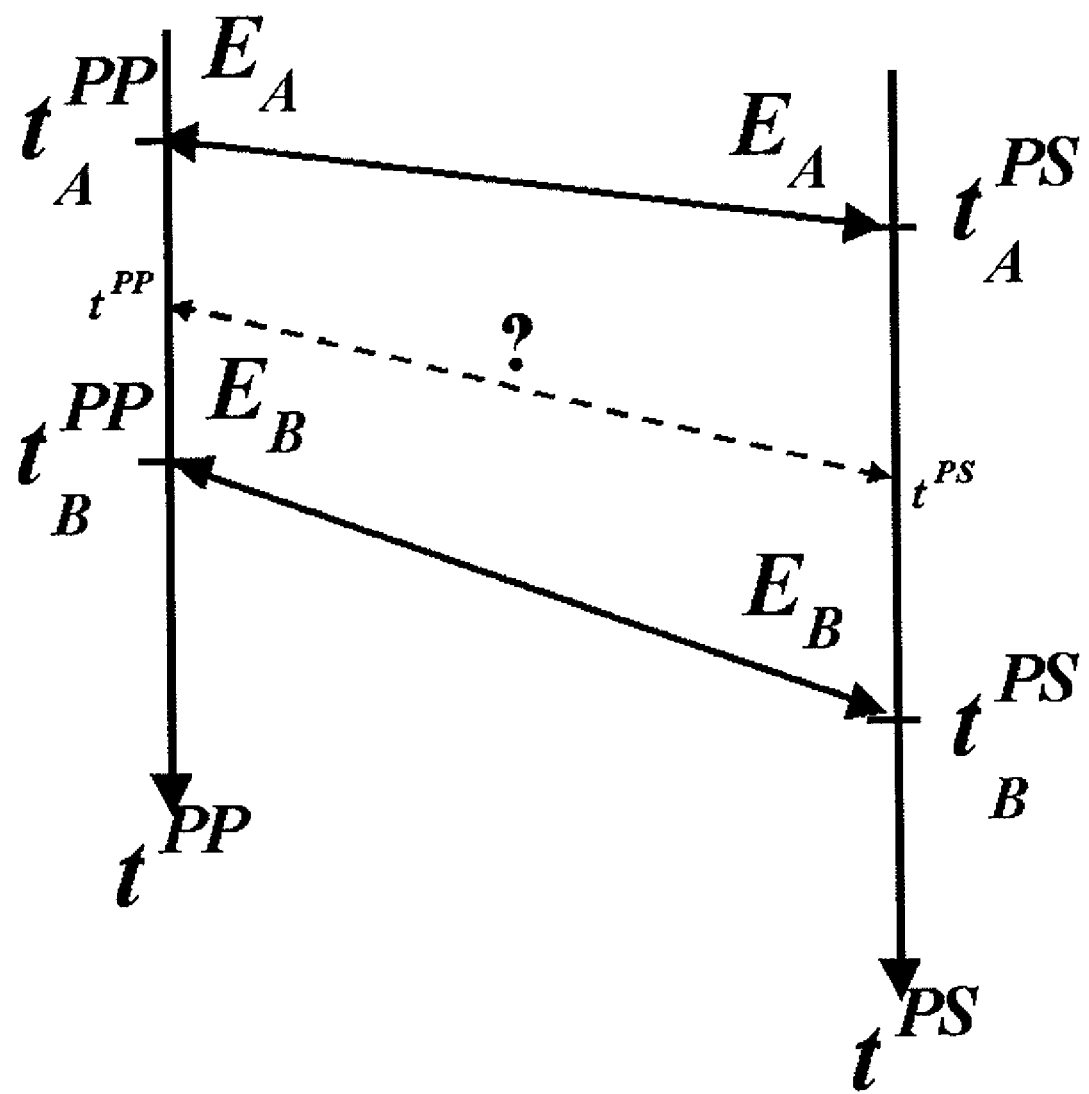
FIG. 1 shows the preliminary matching of PP and PS events corresponding to 2 geologic reflectors $E_A$ and $E_B$.

The method according to the invention relates to a method for constructing a model representative of a heterogeneous medium such as the subsoil, described by one or more parameters (which can be physical quantities or combinations of physical quantities), from data expressed in different time scales. Applied to oil exploration, the method allows improvement of the quantitative description of a reservoir zone from prestack multicomponent seismic data. Suitable preprocessing allows, from the multicomponent data recorded and for each incidence angle range considered, to provide for example, on the one hand, data (referred to as PP data) corresponding to the PP reflections and, on the other hand, data (referred to as PS data) corresponding to the PS reflections.

The method is described in a petroleum context, in the case where PP data and PS data are available. The method can be very easily generalized to other cases (SP reflections, SS reflections). In general terms, it applies to all types of data expressed in different time scales.

The seismic data used within the context of the method contain information on the variation of the amplitude with the offset. The direct and indirect data available for constructing an a priori model of the medium are, for example, logs, seismic exploration data, and other data obtained from earlier geological studies of the medium (cores, laboratories, . . . ).

The method according to the invention provides an inversion technique allowing, when applied to oil exploration, to jointly estimate the P and S impedances of the medium by means of a method of joint inversion of the PP and PS data, which takes account of a priori information such as well data and geologic knowledge about the zone studied.

The method extends the single-component stratigraphic inversion technique described in Tonellot et al., 2001, (and in French Patent 2,800,473 filed by the assignee) to the case of multicomponent data. The problem of matching the PP and PS times relative to the use of multicomponent data is solved by means of an original approach.

The methodology can be split up into three main stages. The first stage sequentially estimates parameters of the model, described in each time scale, from data expressed in different time scales. In the second stage, a scale factor η is determined by best matching a single parameter estimated in the different time scales. Finally, the third stage corresponds to the joint inversion of the data using scale factor η estimated in the second stage.

These stages are described hereafter, in the petroleum context, using the P waves reflected in P waves (PP reflections) and in S waves (PS reflections), but generally the method applies to all types of data expressed in different time scales.

1. Sequential Parameter Estimations from Data Expressed in Different Time Scales The data expressed in different time scales are, in our example, the PP data corresponding to the PP reflections and the PS data corresponding to the PS reflections. The technique used within the context of the invention applied to oil exploration sequentially estimates the descriptive parameters of the medium from each of these two types of data. The P impedances and the S impedances are first estimated from the PP data (in PP time), then the S impedances are estimated from the PS data (in PS time).

In a particular embodiment, it is possible to carry out these estimations from the single-component stratigraphic inversion methodology described by Tonellot et al. (2001). It is applied sequentially to the PP data, then to the PS data. To describe this methodology, a modelling is selected such that the synthetic data are the result of the convolution of the reflection coefficients by the wavelet; but the methodology remains the same whatever the modelling selected. Concerning the PP stratigraphic inversion, the optimum model minimizes the cost function as follows:

$$S^{PP}(m^{PP}) = \sum_\theta \|R_\theta^{PP}(m^{PP}) * w_\theta^{PP} - D_\theta^{PP}\|^2_{(C_d^{PP})^{-1}} + \|m^{PP} - m_{prior}^{PP}\|^2_{(C_m^{PP})^{-1}} \qquad (1)$$

$m^{PP}$ is the current model representative of the subsoil domain studied. It is described by the three parameters, P and S impedances and density ($I_p^{PP}$, $I_s^{PP}$, $\rho^{PP}$) and it is expressed in PP time; exponent PP indicates that the model is estimated from the inversion of the PP data. For a given incidence angle $\theta$, $R_\theta^{PP}$, $w_\theta^{PP}$ and $D_\theta^{PP}$ are respectively the series of reflection coefficients (conventionally the Zoeppritz formulation or one of its approximations) corresponding to the current model, for the given angle $\theta$, the wavelet previously estimated by well-seismics calibration of the PP seismic data associated with angle $\theta$, and the PP seismic data associated with angle $\theta$. $m_{prior}^{PP}$, $C_d^{PP}$ and $C_m^{PP}$ are respectively the PP a priori model and the covariance operators describing the uncertainties respectively on the PP data and the PP a priori model.

Identically to the method provided in French Patent 2,800, 473 filed by the assignee:

the first term of this cost function measures the difference between the PP synthetic data corresponding to the current model $m^{PP}$ and the PP observed data, in the sense of the inverse of covariance matrix $C_d^{PP}$, the second term of this cost function measures the difference between the current model and the a priori model $m_{prior}^{PP}$, in the sense of the inverse of covariance matrix $C_m^{PP}$.

Construction of the a priori model and of the covariance matrices also takes up the characteristics mentioned in this patent.

As regards the PS stratigraphic inversion, the optimum model minimizes cost function $S^{PS}(m^{PS})$ whose expression is obtained simply by replacing PP by PS in Equation (1).

2. Determination of Scale Factor ($\eta$)

In this second stage, a scale factor $\eta$ is sought allowing a best association of the times resulting from a time scale (PS time) with the times resulting from a second time scale (PP time). This factor varies as a function of time and of the lateral position.

A preliminary interpretation stage has to be carried out. It is illustrated in FIG. 1. It associates PS ($t^{PS}$) times with PP ($t^{PP}$) times, by interpretation of events corresponding to at least two geologic reflectors $E_A$ and $E_B$ surrounding the zone of interest. In practice, geologic reflectors $E_A$ and $E_B$ correspond to markers located in the vicinity of wells and known for having a lateral continuity. This stage of matching PP and PS events described in FIG. 1 is common to all the methods that aim association of PP and PS times. We denote by $t_A^{PP}$ (respectively $t_A^{PS}$) the PP time (respectively PS) corresponding to reflector $E_A$ and $t_B^{PP}$ (respectively $t_B^{PS}$) the PP time (respectively PS) corresponding to reflector $E_B$.

Let $t^{PP}$ belong to the [$t_A^{PP}$, $t_B^{PP}$] range. For a given scale factor $\eta$, the PS time associated with time $t^{PP}$ (denoted by $T_\eta^{PS}(t^{PP})$) is:

$$T_\eta^{PS}(t^{PP}) = t_A^{PS} + \int_{t_A^{PP}}^{t^{PP}} \eta(t)\,dt = t_A^{PS} + \int_{t_A^{PP}}^{t^{PP}} \frac{1+\gamma(t)}{2}\,dt \qquad (2)$$

In the case described here from PP and PS data, the scale factor is:

$$\eta = \frac{1+\gamma}{2}.$$

Knowledge of the scale factor allows the PP times to be converted to PS times and vice versa.

The principle of the method according to the invention determines this scale factor $\eta$ by minimizing a certain measurement of the dissimilarity between quantities known both in PP and in PS time, between geologic reflectors $E_A$ and $E_B$. It is for example possible to determine $\eta$ which minimizes a certain measurement of the dissimilarity between the S impedances obtained by inversion of the PP ($I_s^{PP}$) data and the S impedances obtained by inversion of the PS ($I_s^{PS}$) data, these two types of impedance being brought to the same time scale via scale factor $\eta$ (the simplest measurement of this dissimilarity being the Euclidean distance between these two S impedances). More precisely, $I_s^{PP}$ (respectively $I_s^{PS}$) is first filtered in the frequency band of the PP (respectively PS) seismics; in fact, this parameter resulting from the inversion of the PP (respectively PS) seismic data, it is determined only in the frequency band of its data. The two impedances thus obtained are then brought to the same time scale via scale factor $\eta$, then compared (dissimilarity measurement) in the widest frequency band common thereto.

The inverse problem to be solved to estimate $\eta$ (dissimilarity minimization) in this second stage is very non-linear and therefore requires a global optimization procedure (such as simulated annealing for example). This procedure can be very costly, the cost depending on the number of unknowns to be determined. Since the PS time associated with a certain PP time is the time integral of scale factor $\eta$ (Equation (2)), it can be shown that the PP-PS scale change essentially depends on the low-frequency content of $\eta$. Then an attempt to estimate only this low-frequency content is attempted. The quantity $\eta$ is decomposed into a function base having a limited number of base functions (a polynomial base for example). An orthonormal base for each component which is of zero mean can be used. In fact, $\eta$ is sought in a space imposed by the search base: $\eta = \bar{\eta} + \Sigma \alpha_i \Psi_i$ where $\bar{\eta}$ is a fixed value (a priori value, for example the mean established from the events matched in the stage prior to stage 2), $\alpha_i$ is the weight of the i-th base function and $\Psi_i$ is the i-th base function. The number of unknowns is considerably reduced and the calculating time required for this non-linear inversion becomes quite acceptable. The base functions can be 1D, 2D or 3D. If they are 1D for example, such scale factors $\eta$ can be estimated only at certain lateral positions, then laterally interpolated (along an a priori geometry) in all the domain of interest.

The scale factor $\eta$ (low frequency) thus obtained in all the domain will be denoted by $\eta_{LF}$.

In relation to conventional methods for matching the PP and the PS times, carried out directly from the amplitudes of the PP and PS seismic data (Gaiser, 1996), and whose limitations are mentioned in the "Background of the Invention", the advantages of the method are as follows:

the $I_s^{PP}(t^{PP})$, $I_s^{PS}(t^{PS})$ data that are to be matched represent here the same physical quantity, the $I_s^{PP}(t^{PP})$, $I_s^{PS}(t^{PS})$ data result from prestack stratigraphic inversions and therefore contain much less noise than the initial seismic data, in the single-component stratigraphic inversion methodology of Tonellot et al. (2001), the preliminary well-seismics calibration stage allowing determination of a wavelet per angle, for each type of seismic data (PP and PS), allows to best limit the phase mismatches between the two impedances to be associated in time.

3. Joint Stratigraphic Inversion of Data Expressed in Different Time Scales

The third stage corresponds to the joint inversion of data using the scale factor $\eta_{LF}$ estimated in the second stage.

In this third stage, a single multiparameter model m (that is expressed in PP time for example) is sought which minimizes the cost function J as follows:

$$J(m) = \sum_\theta \|R_\theta^{PP}(m) * w_\theta^{PP} - D_\theta^{PP}\|^2_{(C_d^{PP})^{-1}} +$$

$$\sum_\theta \|R_\theta^{PS}(m_{LF}) * w_\theta^{PS} - D_\theta^{PS}\|^2_{(C_d^{PS})^{-1}} + \|m - m_{prior}^{PP}\|^2_{(C_m^{PP})^{-1}}$$

where $m_{LF}$ corresponds to m converted to PS time via the optimum low-frequency scale factor $\eta_{LF}$ obtained in stage 2. This cost function is the sum of 3 terms:
the first term measures the difference between the PP synthetic data corresponding to the current model and the PP observed data, in the sense of the inverse of covariance matrix $C_d^{PP}$,
the second term measures the difference between the PS synthetic data corresponding to the current model m converted to PS time via scale factor $\eta_{LF}$ and the PS observed data, in the sense of the inverse of covariance matrix $C_d^{PS}$,
the third term measures the difference between current model m and multiparameter a priori model $m_{prior}^{PP}$, in the sense of the inverse of covariance matrix $C_m^{PP}$.

The optimum model m will best explain the amplitudes of the PP and PS seismic data, while being sufficiently close to the a priori model. Matching between the PP and the PS times is provided by means of low-frequency scale factor $\eta_{LF}$.

In this approach, the PP and PS seismic data are left in their respective time scales, instead of being brought, via scale factor $\eta_{LF}$, to a common time scale (PP time for example) prior to joint inversion. In fact, $\eta_{LF}$ varying in time and spatially, the PS data converted to PP time will thus undergo a signal deformation, variable in time and in space; it would therefore no longer be possible to consider a single wavelet (depending only on angle θ and on the PP or PS type of the data) for all of the window in time and in space, as it is the case in most inversion techniques, notably the technique used in the method. Furthermore, bringing the data to a common time scale might cause creation or loss of information.

The method can be very easily applied to all types of PP, PS, SP and SS reflections. Equation (2) just has to be adapted to the case considered.

It can also be applied to the case where more than two types of data are considered simultaneously.

The method according to the invention finds applications in very different spheres, according to the type of wave emitted (elastic wave, electromagnetic wave, etc.) to obtain the initial indirect data.

Validation of the Method

Figure 2A:
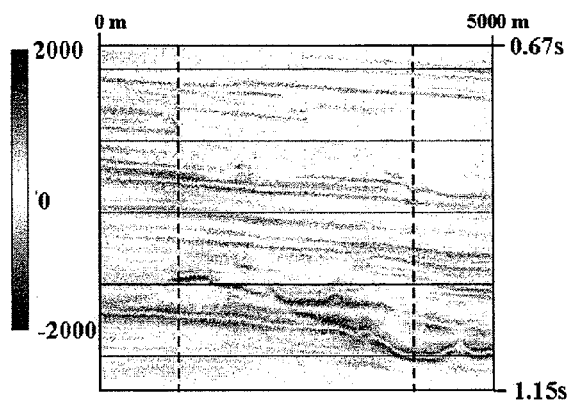
FIG. 2A shows the P type impedance of the exact model in PP time ($I_P^{PP}$), put within the passband of the PP seismics.
Figure 2B:
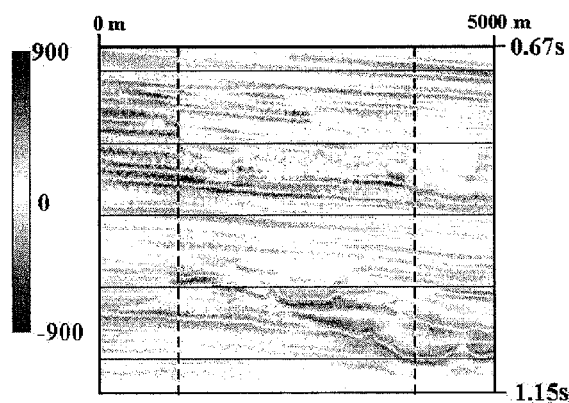
FIG. 2B shows the S type impedance of the exact model in PP time ($I_S^{PP}$), put within the passband of the PP seismics.
Figure 2C:
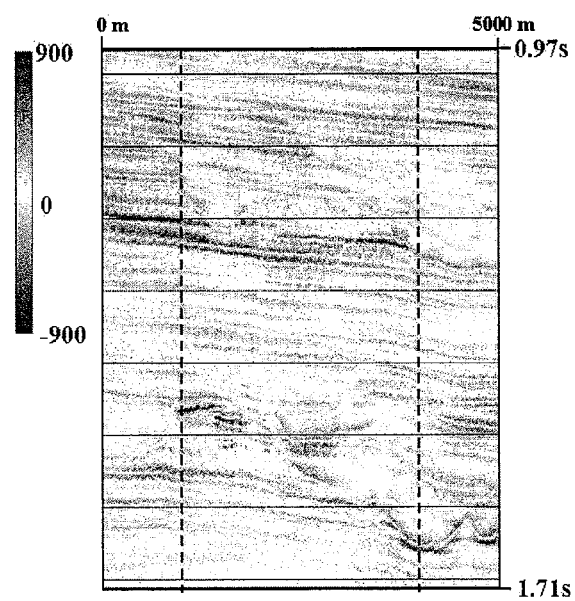
FIG. 2C shows the S type impedance of the exact model in PS time ($I_S^{PS}$), put within the passband of the PS seismics.
Figure 4A:
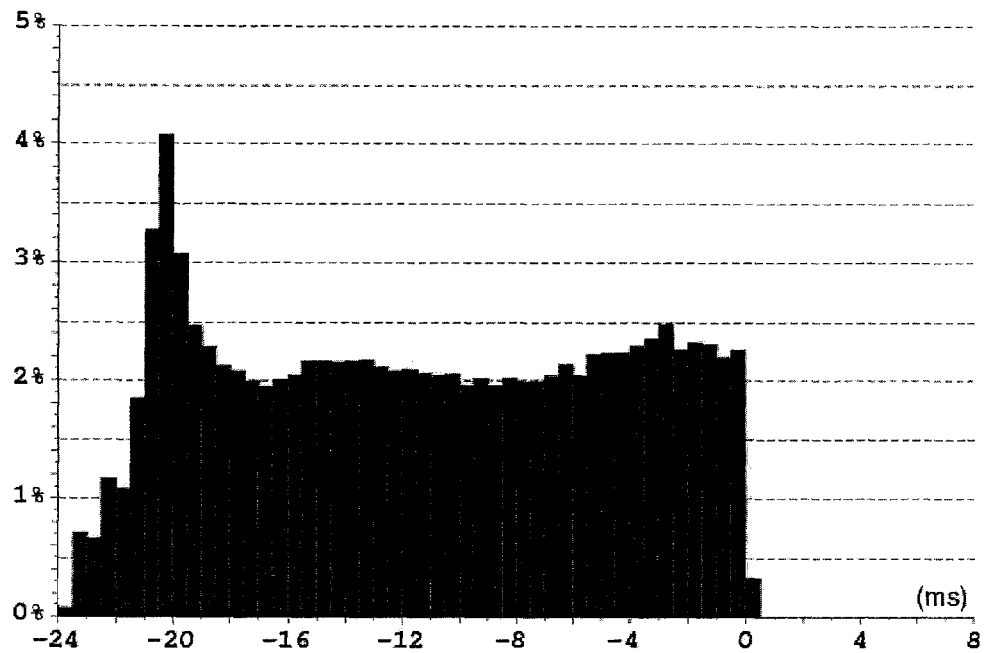
FIG. 4A shows the bar chart of the error on the conversion to PP time obtained using the mean value of η to convert the PS times to PP times.

The method according to the invention is applied to synthetic data corresponding to a realistic subsoil model, as regards the geologic point of view as well as the values selected for the elastic parameters. Particular attention was brought so that γ, the ratio of the P and S velocities, has a significant low-frequency content: therefore the user of a constant η, equal to the mean value that can be calculated from the events bounding the zone of interest and matched in the interpretation stage prior to stage 2, would lead to an error in the conversion of the PS times to PP times that can reach 24 ms. This is illustrated in FIG. 4A, which shows the bar graph of the error on the conversion to PP time (abscissa axis) obtained using the mean value of η to convert PS times to PP times. The model that will be considered as an exact model is obtained by filtering the frequencies above 110 Hz. FIG. 2A, and 2B respectively show the impedance of P type, respectively S type, of the exact model in PP time, put within the passband of the PP seismics. FIG. 2C shows the impedance of S type of the exact model in PS time, put within the passband of the PS seismics. FIG. 2C shows the impedance of S type of the exact model in PS time, put within the passband of the PS seismics. The seismic data are calculated at angles 5, 15, 25 and 35 degrees using Aki and Richards' approximations (1980) to calculate the PP and PS reflection coefficients. The latter are then convoluted by a wavelet whose frequency band is 10-110 Hz. A 30% level random noise is added at each datum-angle. The synthetic data thus obtained have a 2-ms time sampling interval. These synthetic data thus obtained will be used as "observed" seismic data to validate the method according to the aforementioned three stages.

Stage 1

Figure 3A:
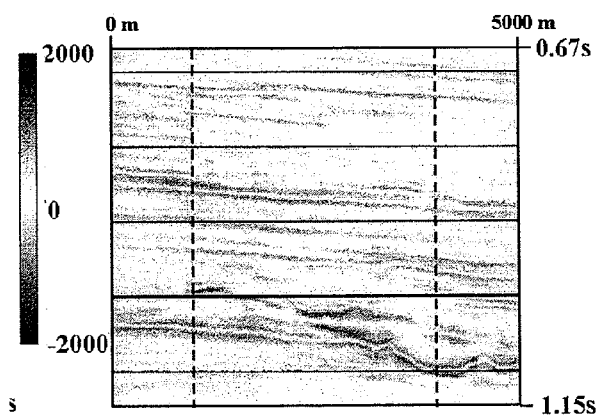
FIG. 3A shows the P type impedance in PP time ($I_P^{PP}$) of the result of single-component inversion of the PP data, put within the passband of the PP seismics.
Figure 3B:
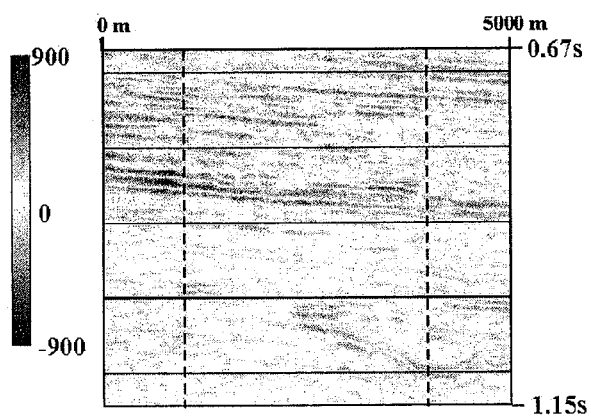
FIG. 3B shows the S type impedance in PP time ($I_S^{PP}$) of the result of single-component inversion of the PP data, put within the passband of the PP seismics.
Figure 3C:
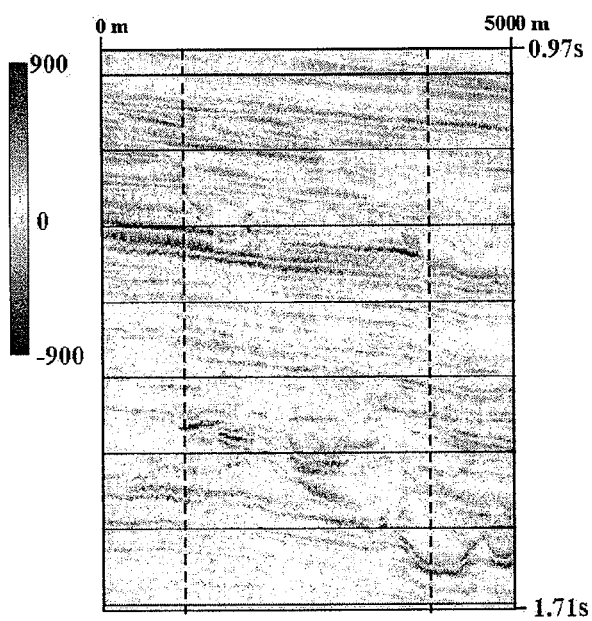
FIG. 3C shows the S type impedance in PS time ($I_S^{PS}$) of the result of single-component inversion of the PS data, put within the passband of the PS seismics.

The PP and PS a priori models are constructed from 2 wells located at lateral positions 50 and 200. The results of this first stage are the P and S impedances (in PP time) obtained from the PP inversion of the PP data, and the S impedance (in PS time) obtained from the PS inversion of the PS data. The main differences concerning the exact impedances are due to the very low frequencies of the a priori model, which cannot be improved by the inversion process. On the other hand, if consideration is given to the impedances in the frequency band of the seismics (FIG. 3A to 3C), the inversion results are very satisfactory. FIG. 3A and 3B show the single-component inversion result for the PP data in impedance of P type in PP time (FIG. 3A) and in impedance of S type in PP time (FIG. 3B), put within the passband of the PP seismics. FIG. 3C illustrates the single-component inversion result of the PS data in impedance of S type in PS ($I_S^{PS}$) time, put within the passband of the P seismics. It can be noted that, as expected, the S impedance obtained by inversion of the PS data (FIG. 3C) is much better determined than the impedance obtained by inversion of the PP data (FIG. 3B).

Stage 2

Figure 4B:
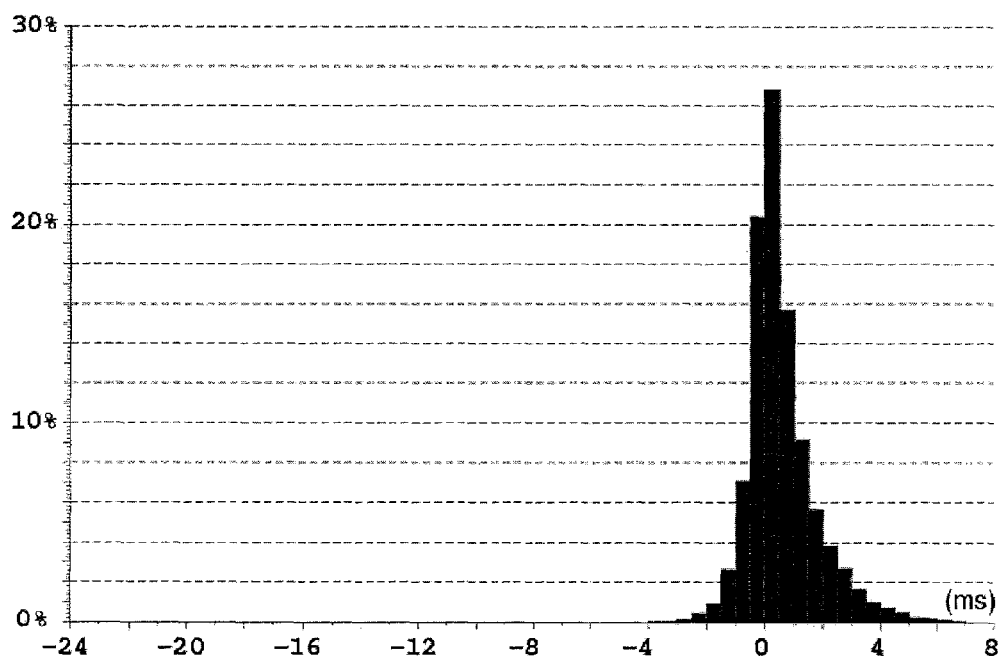
FIG. 4B shows the bar chart of the error on the conversion to PP time obtained using $\eta_{LF}$ determined in stage 2 to convert the PS times to PP times.

The only events previously matched in time correspond to the top of the window (67 ms in PP time) and to the horizon starting at 102.8 ms in PP time (for the lateral position 0). The low-frequency optimum scale factor $\eta_{LF}$ obtained by the method is satisfactory: in fact, conversion of the PS times to PP times, using this factor, leads to very low time errors as shown, by comparison with FIG. 4A, FIG. 4B which shows the bar graph of the error on the conversion to PP time obtained using $\eta_{LF}$ to convert the PS times to PP times.

Stage 3

Figure 5A:
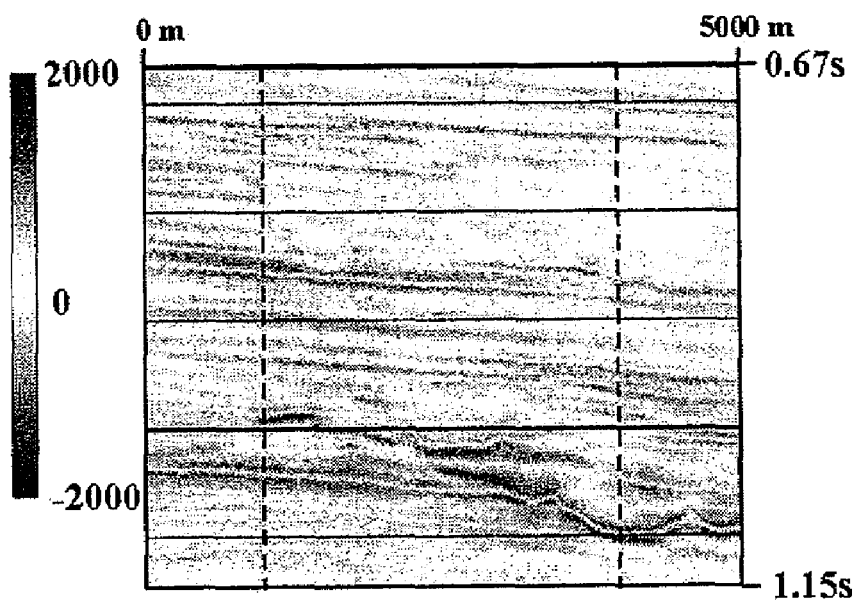
FIG. 5A shows the impedance Ip in PP time of the result of the joint inversion of the PP and PS data, put within the passband of the PP seismics.
Figure 5B:
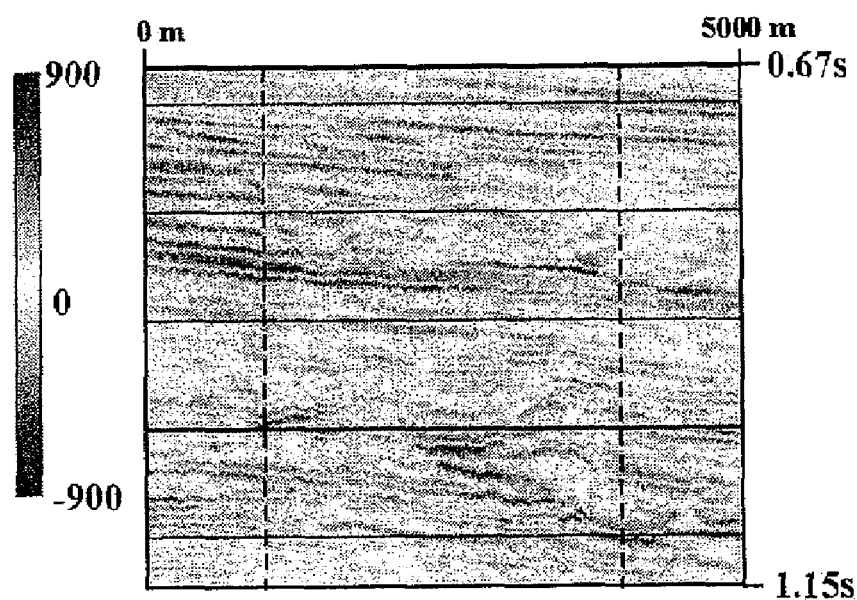
FIG. 5B shows the impedance Is in PP time of the result of the joint inversion of the PP and PS data, put within the passband of the PP seismics.

Joint inversion of the PP and PS times is then carried out using factor $\eta_{LF}$ determined in stage 2: the P and S impedances (in PP time) obtained are shown, after being filtered in the passband of the P seismics, in FIGS. 5A (P impedances) and 5B (S impedances).

Figure 6:
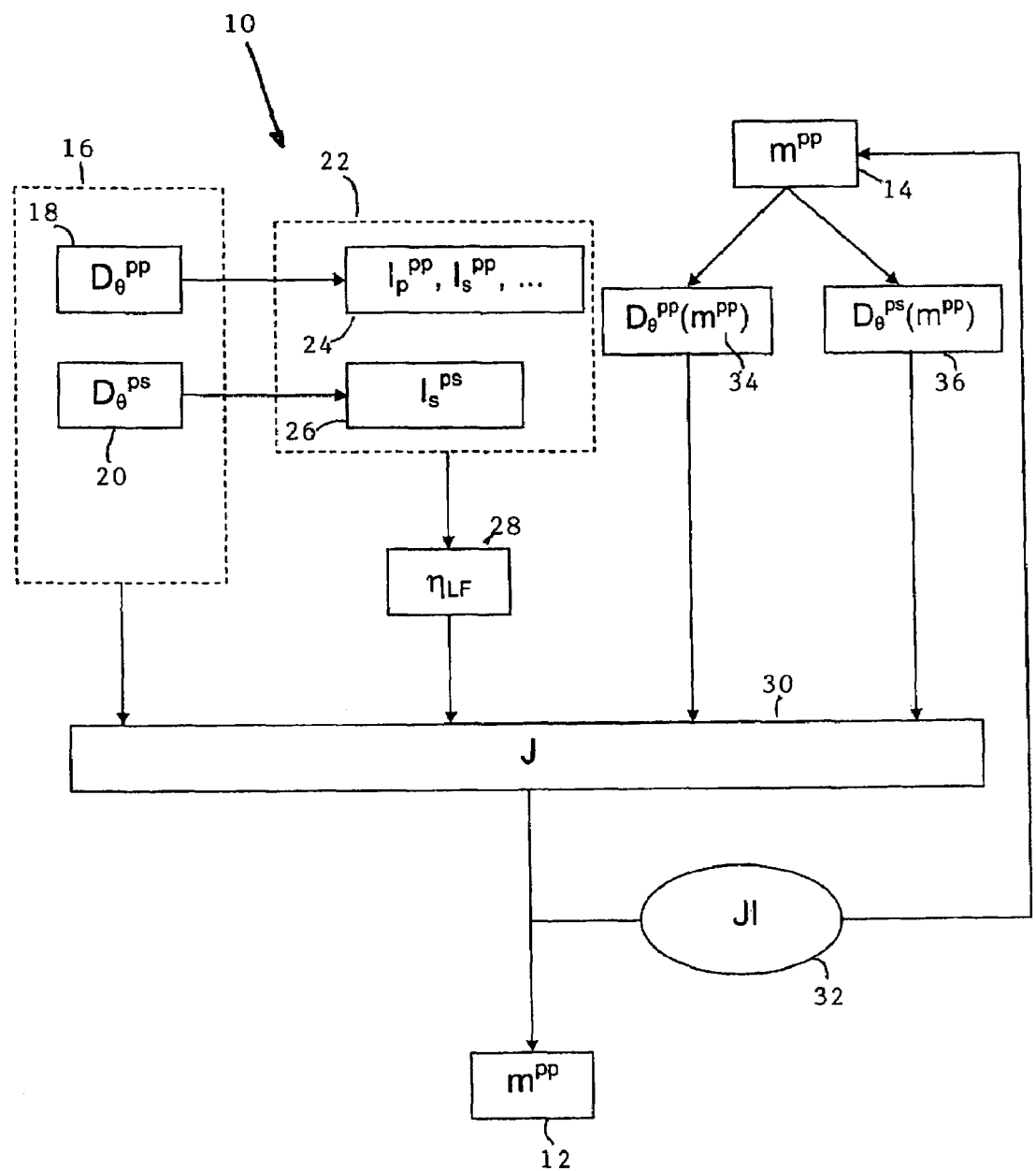
FIG. 6 is a flow chart illustrating a method for constructing a model representative of a heterogeneous medium described by at least one combination of at least one physical quantity, from a procedure of joint inversion of data expressed in different time scales.

FIG. 6 illustrates a method 10 for constructing a model 12 representative of a heterogeneous medium described by at least one combination of at least one physical quantity from a procedure of joint inversion of data expressed in different time in accordance with the invention. The model 12 best explains the amplitude of the PP and PS seismic data while being sufficiently close to the model 14. A source of data 16 provides data 18 $D_\theta^{PS}$ and data 20 $D_\theta^{PS}$. The data 18 and 20 are provided to a cost function 30 J, as described in association with the third stage of the invention set forth above. The data 18 and 20 are also provided to data processing operation 22 wherein a determination of a first estimation 24 of at least one combination of physical quantities of the model from the data $I_p^{PP}$ and $I_s^{PP}$ expressed in the first time scale is calculated and a determination of at least a second estimation 26 of the at least one combination from the data expressed $I_s^{PS}$ in at least a second time scale is made. The output of the estimations 24 and 26 is applied to an analysis function 28 to carry out an analysis of the estimations to determine at least one scale factor which is low frequency allowing establishment of a match between the first time scale and the second time scale. The joint inversion process 30 calculates the cost function J(m). The current model 14 is used for processing 34 of synthetic data $D_\theta^{PP}(m^{PP})$ and processing 36 of synthetic data $D_\theta^{PS}(m^{PP})$ which are data associated with the current model 14 which are applied to the calculations of the cost function 30 J(m). The cost function 30 J(m) output is applied to the joint inversion process 32 JI having an output which is fed back to the current model 14 and also provides a model output 12. The cost function J(m) is used to construct the representative model which is optimized by utilizing the joint inversion procedure JI 32 by minimizing a cost function wherein the at least one scale factor 28 $\eta_{LF}$ allows expression of synthetic data $D_\theta^{PP}(m^{PP})$ and $D_\theta^{PS}(m^{PP})$ associated with the current model 14 of the joint inversion 32 described in a time scale, in another time scale, so as to evaluate a difference between the synthetic data and the data expressed in the other time scale.

The following table sets forth the definition of variables utilized in the aforementioned process 10.

$m^{PP}$: constructed model representative of a heterogeneous medium

JI: procedure of joint inversion $D_\theta^{PP}$: data expressed in a first time scale $D_\theta^{PP}$: data expressed in a second time scale $\eta_{LF}$: a low frequency scale factor J: cost function wherein $I_\theta^{PP}$, $I_s^{PP}$, $p^{PP}$ is first estimation of a combination of physical quantities of the model from the data expressed in a first time scale and $I_\theta^{PS}$ is a second estimation of a combination of physical quantities of the model from the data expressed in a second time scale $D_\theta^{PP}(m^{PP})$ and $D_\theta^{PS}(m^{PP})$ are the synthetic data associated with the current model with the following equalities applying:

$$D_\theta^{PP}(m^{PP}) = R_\theta^{PP}(m) * w_\theta^{PP}$$

$$D_\theta^{PS}(m^{PP}) = R_\theta^{PS}(m) * w_\theta^{PS}$$

For a given angle of incidence $\theta$, $R_\theta^{PP}$ are the reflection coefficients, $w_\theta^{PP}$ is the wavelet previously estimated by the well seismic calibration of the PP seismic data associated with the angle $\theta$ and $D_\theta^{PP}$ are the aforementioned first time scale data.

The invention claimed is:

1. A method for constructing a model representative of a heterogeneous medium described by at least one combination of at least one physical quantity, from a procedure of joint inversion of data representing the heterogeneous medium, which is expressed in different time scales, comprising:

determining with a computer a first estimation of at least one combination of physical quantities of the model from the data expressed in a first time scale;

determining with a computer at least a second estimation of the at least one combination from the data expressed in at least a second time scale;

carrying out with a computer an analysis of the estimations to determine at least one scale factor allowing establishment of a match between the first time scale and the second time scale;

performing with a computer, in order to construct the model representative of the heterogeneous medium, the joint inversion of the data by minimizing a cost function wherein the at least one scale factor allows expression of synthetic data associated with a model of the joint inversion described in a time scale, in another time scale, so as to evaluate a difference between the synthetic data and the data expressed in the another time scale; and wherein the data expressed in different time scales results from one of electromagnetic or elastic waves emitted in the medium and only a low-frequency part of the at least one scale factor is determined.

2. A method as claimed in claim 1, wherein the data are prestack multicomponent seismic data.

3. A method as claimed in claim 1, wherein one of the time scales represents a scale of arrival times of non-converted P waves.

4. A method as claimed in claim 1, wherein one of the time scales represents a scale of arrival times of converted P waves.

5. A method as claimed in claim 1, wherein one of the time scales represents a scale of arrival times of non-converted S waves.

6. A method as claimed in claim 1, wherein one of the time scales represents a scale of arrival times of converted S waves.

7. A method as claimed in claim 1, wherein the combination of at least one physical quantity represents impedances.

8. A method as claimed in claim 7, wherein the impedances are impedances relative to S waves.

9. A method as claimed in claim 1, wherein estimation of the at least one combination of the physical quantities comprises a single-component inversion.

10. A method as claimed in claim 9, wherein the joint inversion is a stratigraphic inversion comprising using a priori information including in-situ measured data.

11. A method as claimed in claim 1, wherein the at least one scale factor is determined by minimizing dissimilarity of the estimations.

12. A method for constructing a model representative of a heterogeneous medium described by at least one combination of at least one physical quantity, from a procedure of joint inversion of data representing the heterogeneous medium, which is expressed in different time scales, comprising:

determining with a computer a first estimation of at least one combination of physical quantities of the model from the data expressed in a first time scale;

determining with a computer at least a second estimation of the at least one combination from the data expressed in at least a second time scale;

carrying out with a computer an analysis of the estimations to determine at least one scale factor allowing establishment of a match between the first time scale and the second time scale;

performing with a computer, in order to construct the model representative of the heterogeneous medium, the joint inversion of the data by minimizing a cost function wherein the at least one scale factor allows expression of synthetic data associated with a model of the joint inversion described in a time scale, in another time scale, so as to evaluate a difference between the synthetic data and the data expressed in the another time scale; and wherein the data expressed in different time scales results from elastic or magnetic waves emitted in the medium, and determination of the at least one scale factor comprises parameterizing the at least one scale factor in a base of base functions.

13. A method for constructing a model representative of a heterogeneous medium described by at least one combination of at least one physical quantity, from a procedure of joint inversion of data representing the heterogeneous medium, which is expressed in different time scales, comprising:

determining with a computer a first estimation of at least one combination of physical quantities of the model from the data expressed in a first time scale;

determining with a computer at least a second estimation of the at least one combination from the data expressed in at least a second time scale;

carrying out with a computer an analysis of the estimations to determine at least one scale factor allowing establishment of a match between the first time scale and the second time scale;

performing with a computer, in order to construct the model representative of the heterogeneous medium, the joint inversion of the data by minimizing a cost function wherein the at least one scale factor allows expression of synthetic data associated with a model of the joint inversion described in a time scale, in another time scale, so as to evaluate a difference between the synthetic data and the data expressed in the another time scale; and wherein the data expressed in different time scales results from electromagnetic or elastic waves emitted in the medium and the data undergo no scale change.

* * * * *